United States Patent

[11] 3,623,693

[72] Inventor William Frank Hill
 Stafford, England
[21] Appl. No. 841,253
[22] Filed July 14, 1969
[45] Patented Nov. 30, 1971
[73] Assignee Joseph Lucas (Industries) Limited
 Birmingham, England
[32] Priority July 25, 1968
[33] Great Britain
[31] 35,484/68

[54] ASSEMBLAGE FOR USE WITH A ROAD
 VEHICLE THROTTLE VALVE FOR ACHIEVING
 FUEL ECONOMY
 1 Claim, 1 Drawing Fig.
[52] U.S. Cl. .................................................. 251/26,
 251/38, 251/295, 91/376, 123/108
[51] Int. Cl. ....................................................... F15b 9/10,
 F16k 31/12

[50] Field of Search ........................................... 91/376;
 123/98, 108; 251/26, 38, 295

[56] References Cited
 UNITED STATES PATENTS
 2,808,705 10/1957 Ingres ........................... 91/376
 3,104,590 9/1963 Kellogg et al. ................ 123/98
 3,180,232 4/1965 Ayers, Jr. ...................... 123/98
 3,237,527 3/1966 Martin .......................... 123/98

Primary Examiner—Paul E. Maslousky
Attorney—Holman & Stern

ABSTRACT: In a road vehicle the throttle pedal is servo assisted, but the servo assistance is removed under predetermined conditions so that the drive has to press the pedal harder. The predetermined conditions can be chosen so that if pinging occurs the driver receives a signal that he must ease back on the throttle pedal so as to regain the servo assistance. In this way fuel economy can readily be obtained.

PATENTED NOV 30 1971　　3,623,693
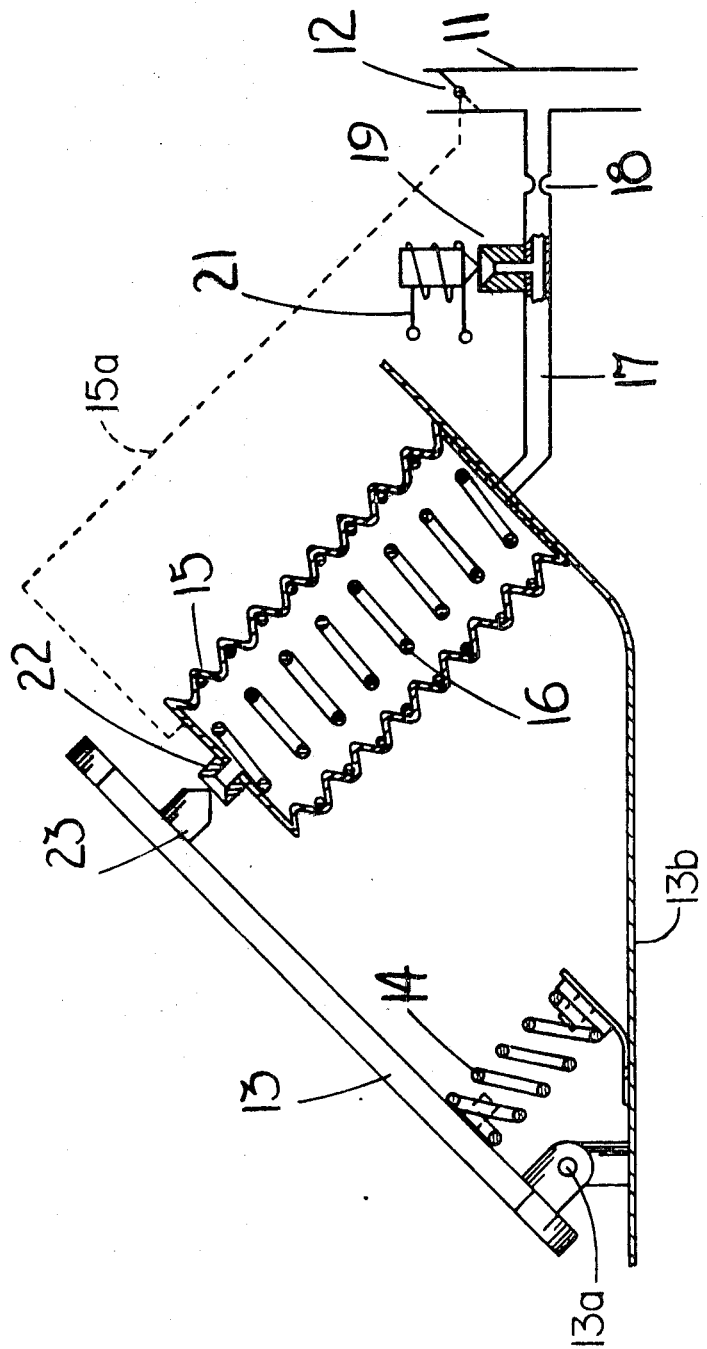
INVENTOR
William Frank Hill
BY Holman, Glascock
Downing & Seebrek
ATTORNEYS

AN ASSEMBLAGE FOR USE WITH A ROAD VEHICLE THROTTLE VALVE FOR ACHIEVING FUEL ECONOMY

This invention relates to a mechanism for use with a road vehicle provided with an engine throttle valve for achieving fuel economy.

The basic idea of the invention is to provide a throttle pedal which is servo assisted, and to remove the servo assistance under certain predetermined conditions. In this way, although the driver can still operate the throttle pedal, he has to press it harder than when the pedal is servo assisted, so that a warning is given to the driver that the predetermined set of circumstances subsists.

The accompanying drawing is a diagrammatic illustration of one example of the invention.

Referring to the drawing, the inlet manifold 11 of the engine of a road vehicle includes a throttle valve 12 which operates in the usual way. The valve is controlled by the throttle pedal 13 of the vehicle, which is pivotally mounted at 13a to floor 13b of the vehicle and urged to its rest position shown by a light return spring 14. Associated with the throttle pedal 13 is a vacuum actuator comprising a bellows 15 containing a spring 16 which urges the bellows 15 to the position shown. The spring 16 is considerably stronger than the spring 14, and the bellows 15 is coupled to the throttle valve as depicted at 15a downward movement of the bellows 15 opens the valve 12. The lower end of the bellows 15 is coupled, through a pipe 17 having a restrictor 18 therein, to the inlet manifold 11, and in the pipe 17 is a valve 19 whereby the pipe 17 can be open to atmosphere under the control of a winding 21. The upper end of the bellows 15 is opened through one part 22 of a valve, the other part 23 of which is carried by the throttle pedal 13.

In operation, assuming the valve 19 to be closed, then the manifold depression within the bellows 15 acts against the spring 16 to keep the bellows 15 in an equilibrium position, with the throttle valve 12 being suitably adjusted by the bellows 15. When the throttle pedal 13 is moved downwardly, the valve part 23 approaches the valve part 22, so restricting flow through the valves 22, 23 and causing the bellows 15 to move downwardly following the movement of the pedal 13. However, if at any time the manifold depression becomes too low, then the valve part 23 engages the valve part 22 to close the valve, so removing the servo assistance. Further depression of the pedal 13 then takes place against the action of the spring 16, which, as previously stated, is considerably stronger than the spring 14, so that the driver will feel a noticeable difference in the force he has to apply to the pedal 13. The return spring for the throttle valve 12 is of course chosen to be suitable for the servo-assisted action.

In a particular example, it is arranged that the servo assistance is removed at a manifold depression of the order of 2 inches of mercury. With this arrangement, assuming the car is being operated on petrol of lower octane rating than that required, servo assistance will be available as long as the vehicle is driven in a manner to avoid pinging. However, if the vehicle is being driven in such a way that pinging is liable to occur, in other words if the driver attempts to use large throttle openings at low engine speeds the valves 22, 23 will close and the driver will be given a warning by the removal of the servo assistance. He can then take the appropriate action, by limiting the throttle opening at all engine speeds so as to keep enough manifold depression to provide servo assistance. In this way a valuable saving in fuel can be made.

The winding 21 receives a signal from a speed-responsive circuit operated by an electromagnetic pickup, which produces a signal representing the speed of the vehicle. The arrangement is such that at a predetermined engine speed, the winding 21 opens the valve 19, so removing the servo assistance. The driver is thus given a warning that he has reached the selected speed. If desired, a manually operable device can be utilized to enable the driver to set the speed.

It will of course be appreciated that the valve 19 could be provided without the valves 22, 23 or vice versa, and that the servo assistance could be removed under other selected conditions as well as, or instead of the conditions described.

Having thus described my invention what I claim as new and desire to secure by Letters Patent is:

1. An assemblage for achieving fuel economy for use with a road vehicle engine having an inlet manifold, a throttle valve located in the inlet manifold and a vehicle floorboard, a throttle pedal pivotally mounted adjacent one end thereof to the floorboard for movement toward and away from the floorboard, first spring means in proximity to the pivotal mounting of the pedal biased between the pedal and floorboard normally urging the pedal to a rest position, a vacuum actuator comprising a bellows having opposite ends, means attaching one end of the bellows to the floorboard, with the opposite end, in the extended position of the bellows, being adjacent the pedal at a location adjacent to but spaced from the other end of the pedal, conduit means providing communication between the interior of the bellows and the inlet manifold, valve means providing communication between the interior of the bellows and atmosphere, said valve means including a part carried by the other end of the bellows and complemental part carried by the pedal, a second spring means within the bellows biased between the ends thereof, said first spring means being located outside of said bellows, said second spring means being considerably stronger than said first spring means for urging the bellows to a position in which said part and complemental part coact to close the valve means, the arrangement being such that provided the pedal does not move too quickly about its pivotal mounting, the bellows retracts with the pedal to operate the throttle valve with servo assistance, the servo assistance overcoming the action of the second spring means so that only the resistance of the first spring means is felt by the operator, while upon too quick movement of the pedal, the part carried by the bellows and the complemental part carried by the pedal cooperate to close the valve means whereby the pedal moves the bellows mechanically against the action of the second spring means to operate the throttle valve, and the movement of the pedal being opposed by the combined action of the second spring means and the bellows and the first spring means.

* * * * *